United States Patent
Tai

Patent Number: 5,854,872
Date of Patent: Dec. 29, 1998

[54] DIVERGENT ANGLE ROTATOR SYSTEM AND METHOD FOR COLLIMATING LIGHT BEAMS

[75] Inventor: Chen-Yu Tai, Toleda, Ohio

[73] Assignee: Clio Technologies, Inc., Holland, Ohio

[21] Appl. No.: 725,942

[22] Filed: Oct. 8, 1996

[51] Int. Cl.$^6$ ............................................. G02B 6/34
[52] U.S. Cl. .................. 385/133; 362/32; 362/302; 362/309; 362/339; 385/36; 385/43; 385/146; 385/901
[58] Field of Search .................. 385/31, 36, 43, 385/129–131, 133, 146, 147, 901; 362/26, 31, 32, 297, 302, 307–309, 311, 327, 330, 339; 349/61, 62, 64–67, 112, 113

[56] References Cited

U.S. PATENT DOCUMENTS

| | | | |
|---|---|---|---|
| 4,917,465 | 4/1990 | Conner et al. | 350/335 |
| 5,050,946 | 9/1991 | Hathaway et al. | 385/33 |
| 5,187,765 | 2/1993 | Muehlemann et al. | 385/901 X |
| 5,202,950 | 4/1993 | Arego et al. | 385/901 X |
| 5,226,105 | 7/1993 | Myers | 385/901 X |
| 5,339,382 | 8/1994 | Whitehead | 385/146 |
| 5,359,691 | 10/1994 | Tai et al. | 385/146 |
| 5,390,276 | 2/1995 | Tai et al. | 385/146 |
| 5,396,350 | 3/1995 | Beeson et al. | 359/40 |
| 5,461,547 | 10/1995 | Ciupke et al. | 362/31 |
| 5,467,208 | 11/1995 | Kokawa et al. | 349/67 |
| 5,485,354 | 1/1996 | Ciupke et al. | 362/31 |
| 5,506,929 | 4/1996 | Tai et al. | 385/146 |
| 5,528,720 | 6/1996 | Winston et al. | 385/146 |
| 5,608,837 | 3/1997 | Tai et al. | 385/146 |
| 5,627,926 | 5/1997 | Nakamura et al. | 385/36 |

FOREIGN PATENT DOCUMENTS

| | | | | |
|---|---|---|---|---|
| 3825436 | 3/1989 | Germany | | 350/96.1 |
| 62-0073206 | 4/1987 | Japan | | 350/96.1 |
| 63-0271301 | 11/1988 | Japan | | 350/96.1 |
| 63-0287803 | 11/1988 | Japan | | 350/96.1 |

*Primary Examiner*—John D. Lee
*Attorney, Agent, or Firm*—Marger Johnson & McCollom, PC

[57] ABSTRACT

An assembly for frontlighting or backlighting a display or other such arrangement requiring frontlighting or backlighting is disclosed herein. The assembly uses a light pipe with a set of specially configured microprisms to rotate the divergent angle of light. The divergent angle rotator is used with a flat collimator assembly for efficient display illuminating with light of a controllable degree of collimation in both dimensions.

49 Claims, 8 Drawing Sheets

DIVERGENT ANGLE ROTATOR SYSTEM AND METHOD FOR COLLIMATING LIGHT BEAMS

FIELD OF THE INVENTION

This invention relates generally to frontlighting and backlighting systems especially suitable for use with liquid crystal display devices. In particular, this invention relates to a film and/or a light pipe having elongated microprismatic structures which enable controllable collimation of light in two dimensions for an efficient frontlight or backlight.

BACKGROUND OF THE INVENTION

Liquid crystal displays (LCDs) are commonly used in portable computer systems, televisions, mobile phones, and other electronic display devices. Because LCDs are typically viewed in well-lit environments, high performance LCD devices require a high light output for sufficient viewing brightness. Thus, these high performance LCDs which require a source of lighting for sufficient brightness, backlighting systems being the most popular source of light.

The configuration for a back-lit LCD device often includes two thin panels. One is the LCD device itself. The second, a backlight, is a light pipe configured to direct light out of its top panel's surface, into and through the LCD device. The more light that is directed out of the backlight panel surface without energy loss in transmission, the more efficient the backlight. Particularly, collimated light output from the backlight desirably transmits evenly through the LCD device.

To illustrate light collimation consider a light beam in a three dimensional Cartesian coordinate system, that is, in x-y-z space, emanating from the point of origin of the Cartesian coordinates. Below, for convenience, however in discussing divergence and angles of rotation of light beams, collimation will be discussed and depicted in angle space which can be visualized relative to the x-y-z space. Angle space as used below, depicts a light beam on a plot of two axis, $\theta$ on the vertical axis and $\phi$ on the horizontal axis. $\theta$ is the angle of a light beam projected onto the x-y plane and $\phi$ is the angle of that same light beam projected onto the y-z plane. Therefore, a light beam depicted in a Cartesian coordinate system can be plotted as a point in angle space. As used below, a light beam has a divergent angle $\theta$ when it is not parallel to the x-y plane and a divergent angle $\phi$ when it is not normal (perpendicular) to the y-z plane.

Another way of describing divergent light beams is to say that light beams are divergent when they move apart from a common point. Accordingly, substantially divergent uncollimated light rays will form a wide mouthed cone with its point at a point light source. (Any light source can be thought of as a collection of point light sources.) When the cone shaped divergent uncollimated light is collimated in a single dimension, the light rays are redirected so that they form a emanating fan from that point-like light source, but still having the same angular volume as that of the original wide mouthed cone. While single dimensional collimation is desirable, two dimensional collimation is more desirable. Two dimensional collimation would turn the wide spread fan back into a cone, but with a substantially reduced angular volume. Thus, to collimate light in two dimensions is to make three dimensionally divergent light rays more parallel.

The flat collimator described in U.S. Pat. Nos. 5,359,691 and 5,390,276, each issued to Tai et al. on Oct. 25, 1994 and Feb. 14, 1995, respectively, Tai being an inventor of the present invention, provides efficient backlighting, and are hereby incorporated by reference. Those backlights are configured with linear light sources along a light pipe's light entrance end and the light projected into the light pipe is collimated in one dimension by microprisms. A feed-back mechanism collimates light in the second dimension. Divergent angles are thus reduced and the output light rays are substantially collimated.

While the backlights provide sufficient light to brightly light LCD devices, the linear light source at times may take up more space than desirable. Therefore, it is desirable to have a frontlight or backlight configured with a point-like light source.

A beam expander technology, described in U.S. Pat. No. 5,506,929, issued Apr. 9. 1996, also issued to Tai et al. provides an approach to using point-like light sources such as light emitting diodes and incandescent lamps to illuminate a display and is hereby incorporated by reference. The beam expander is used in place of the linear light source, distributing the light of a point-like light source in the manner substantially similar to that of a linear light source.

Again, while the light transmitted from either a point-like light source or a linear light source is directed by a beam expander into a microprism based flat collimator, the light is collimated efficiently in a single dimension. To compensate, the beam expander provides collimation in the second dimension by a feed back mechanism. A feed back mechanism, however, tends to cause energy loss.

A prior art backlight which two dimensionally collimates light, described in U.S. Pat. No. 5,396,350, issued to Beeson et al. on Mar. 7, 1995, depends on the multiple cycling of light. The three dimensional structure includes a plurality of micro lenses, each atop a small aperture on the top surface of the light pipe. While light passing through an aperture is collimated, only a fraction of the light beams in the light pipe are incident on the small apertures. The light beams that hit other areas of the light pipe are inefficiently reflected back and recycled. The recycled light of prior art system suffers from energy losses due to scattering since no surface is perfectly smooth. Moreover, energy loss due to scattering in the material, the so-called haze, is unavoidable. Additionally the prior art is complicated and difficult to manufacture since it has a three dimensional structure.

SUMMARY OF THE INVENTION

As will be discussed in more detail thereinafter, this invention is a divergent angle rotator for light beams. To achieve the desired two dimensional collimation for the light transmitted out of the light pipe into the LCD device, the divergent angles of light propagating and incident on surfaces of the light pipe are collimated in two dimensions by a divergent angle rotator of this invention.

The divergent angle rotator includes rows of microprisms having their prism axis in the mean propagation direction of light to reflect light sideways. When incorporated into a frontlighting or backlighting system which uses microprisms and/or films to collimate light in one dimension and reflect it out of the light pipe into an LCD for example, the divergent angle rotator collimates light in two dimensions. Accordingly, an optical assembly using a divergent angle rotator to two dimensionally collimate light includes one or more frontlighting or backlighting light pipes, and at least one of the optical component having elongated microprism structures with their prism axis approximately in the mean propagation direction of light beams to rotate their divergent angles.

The assembly also includes a generally rectangular backlighting light pipe into which light is directed from one or more sides and is caused to move from one end of the light pipe towards the opposing end, and a second arrangement of immediately adjacent microprisms serving as the bottom surface of the light pipe. The second arrangement of microprisms reflect light within the light pipe upwards and through the top surface by total internal reflection. Also included is a film with microprisms to modify the angular distribution profile of the output light.

Using the divergent angle rotator as part of a beam expander and/or the light pipe itself, controllable two dimensional collimated output light provides for an energy efficient frontlighting or backlighting system. A film with an elongated prism structure also changes the propagation direction of light output from a frontlighting or backlighting system.

DESCRIPTION OF THE DRAWINGS

The present invention will be described in more detail hereafter in conjunction with the drawings, wherein.

DETAILED DESCRIPTION OF THE PREFERRED EMBODIMENT

Figure 1:
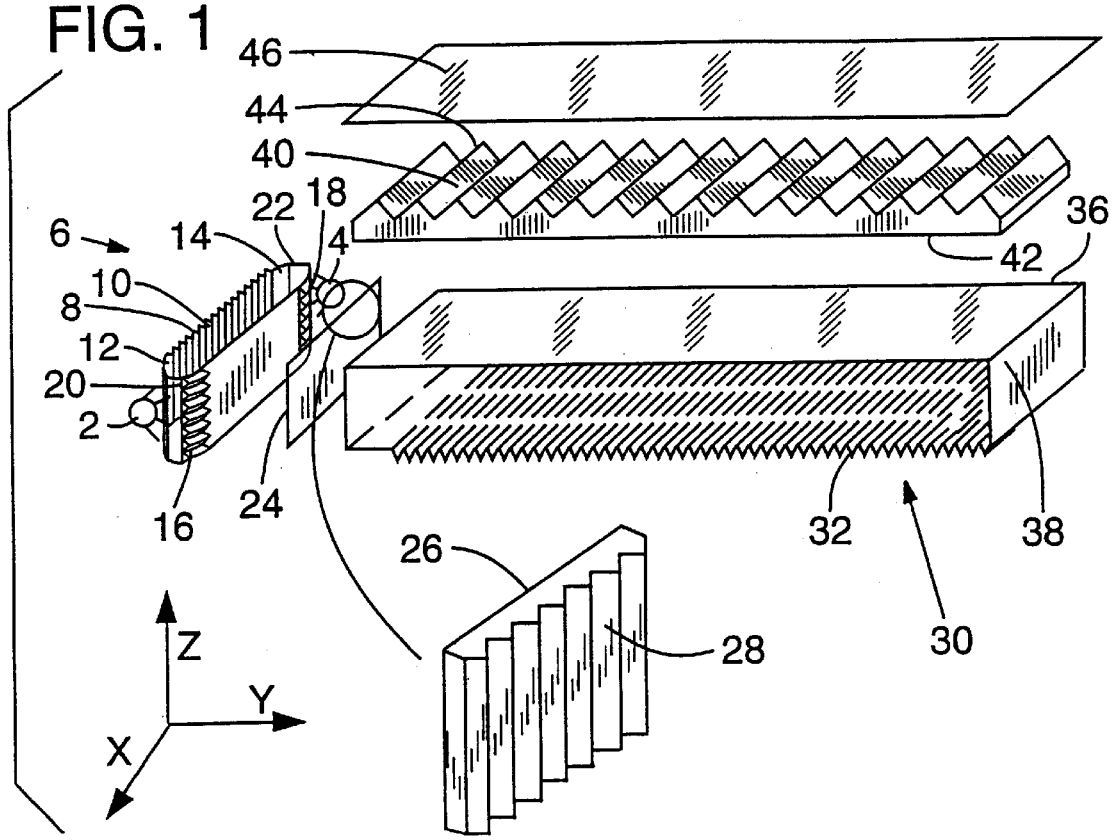
FIG. 1 is a perspective view of a beam expanding assembly using microprisms in conjunction with a light pipe. An x, y, z coordinate system is also depicted.

Turning now to drawings, wherein like components are designed by like reference numerals throughout the various figures, attention is directed to FIG. 1 which shows a backlighting assembly system using two light emitting diodes (LED) 2 and 4 as its light sources. Light from the LEDs is first expanded into a line-like light source by a beam expander 6 which is a narrow and long light pipe using microprisms 8 located on surface 10. Light is then reflected out of the beam expander 6 in the direction of backlighting light pipe 30.

Arrangements 12 and 14 which are shown as integral to beam expander 6 but may be separate units, direct and collimate light injected into the beam expander in accordance with this invention. Arrangements 12 and 14 have elongated microprism structures 16 and 18 on their respective surfaces 20 and 22 to rotate the divergent angle of light beams so that the output light is collimated in two dimensions. The axes of the elongated microprism structures 16 and 18 are roughly in the mean propagation direction of light generated by LEDs 2 and 4. By collimating light in the beam expander 6, its output is therefore better collimated.

Light output from the beam expander is injected into backlighting light pipe 30 to be further expanded into a plane-like light source for display backlighting. A film 24 with microprism structures 28 on its surface is placed in front of the beam expander 6 to bend the light output from the beam expander. The backlighting light pipe 30 has microprisms 32 located on its bottom surface 34 to reflect light out of the light pipe by total internal reflection. A film 42 with microprisms 44 located on its surface 40 is used to bend the light towards an LCD, for example. A diffuser 46 is used to expand the divergent angle of the output light and also provides an improved uniformity.

Figure 2:
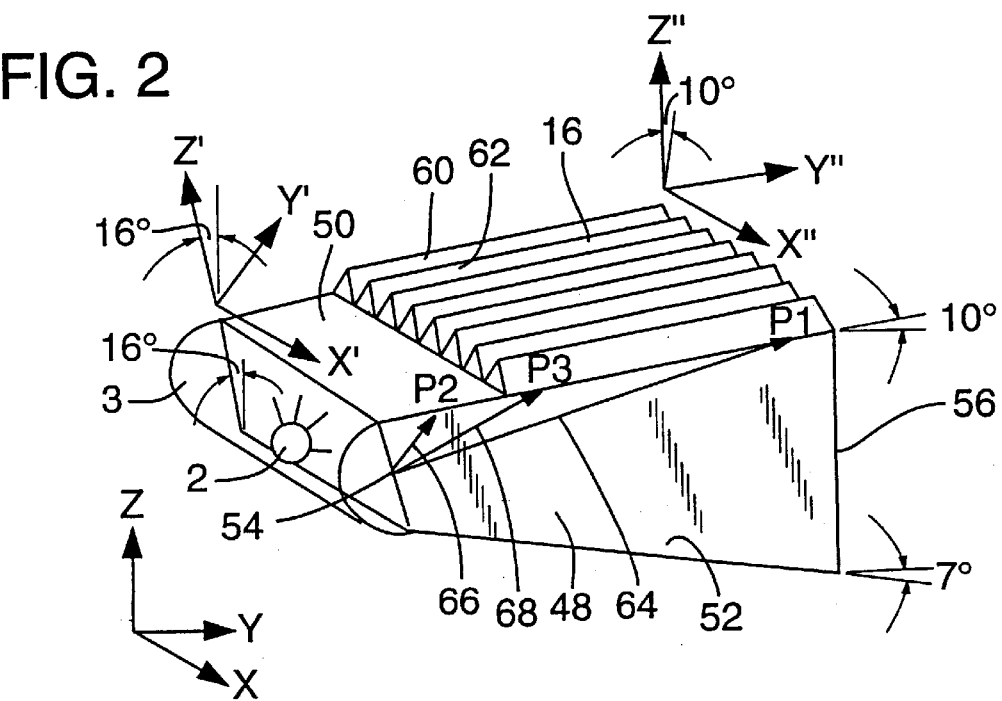
FIG. 2 is a sectional view of a light beam divergent angle rotator, taken in x-z plane.

Turning now to FIG. 2, a sectional view is depicted of arrangement 12 and light source 2 which may be wrapped by a reflector 3. The arrangement 12 includes a collimating prism 48. The prism 48 has opposing side surfaces 50 and 52 and opposing ends 54 and 56. Light entering the prism has a maximum divergence angle determined by the index of refraction of the material that the prism is made of (42° if the prism is made of acrylic which has an index of refraction of 1.49).

Figure 4:
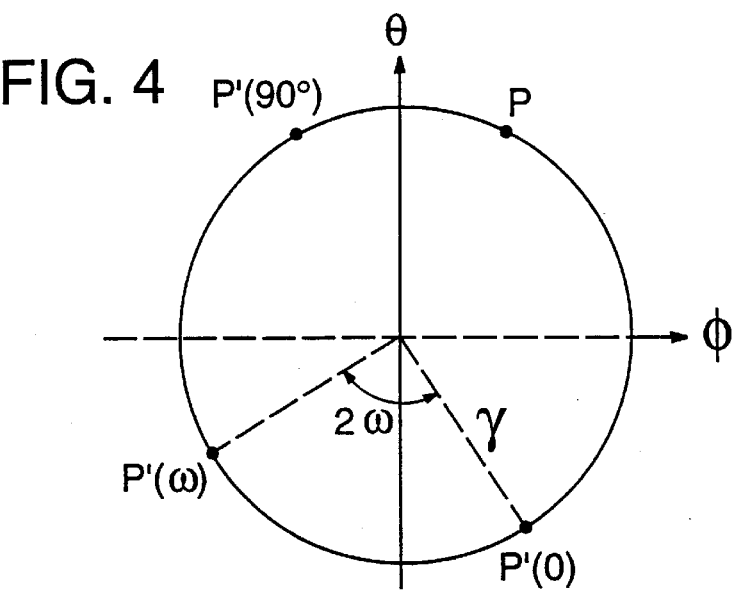
FIG. 4 is a diagram of incident light and reflected light in the angle space.

The side surfaces 50 and 52 are constructed at a tilt angles 50a and 52a, for example 10° and 7° respectively with respect to the x-axis, as illustrated in FIG. 4. The entrance side 54 makes an angle 54a of 16° with the y-z plane and is tilted towards the side 50. Thus, the sides 50 and 52 have a tilt angle to collimate light.

FIG. 2 also shows that surface 50 of arrangement 12 includes elongated microprism structure 16 of this invention. As will be discussed in detail below, elongated microprism structure 16 rotates the divergent angle of light so that light output from the arrangement 12 is collimated in both θ and φ dimensions.

Figure 3A:
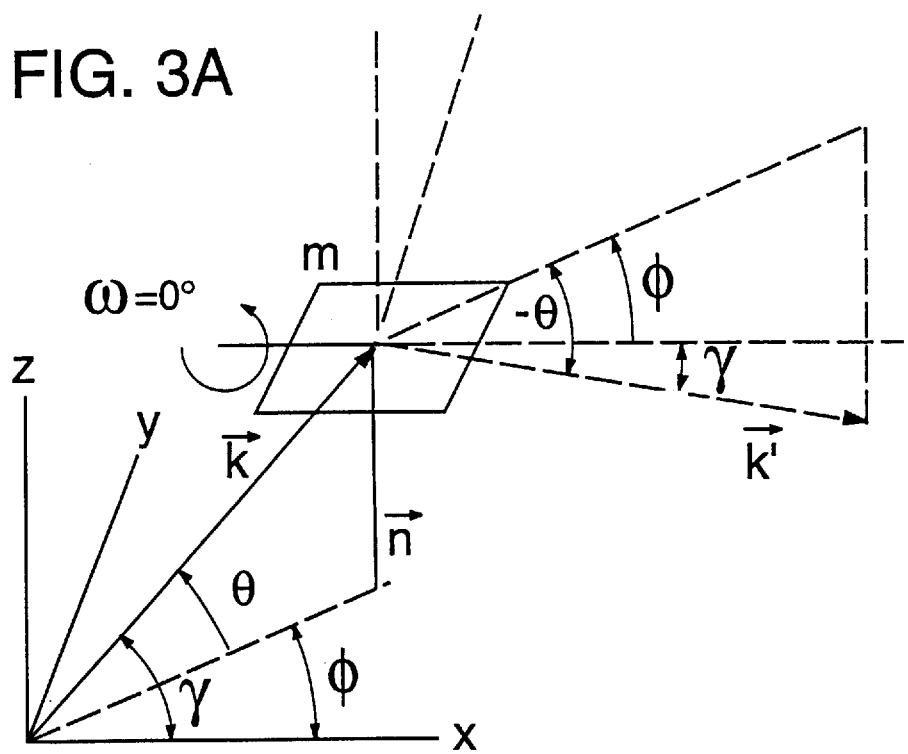
FIG. 3A is a perspective view of a light beam reflected by a horizontal plane.
Figure 3B:
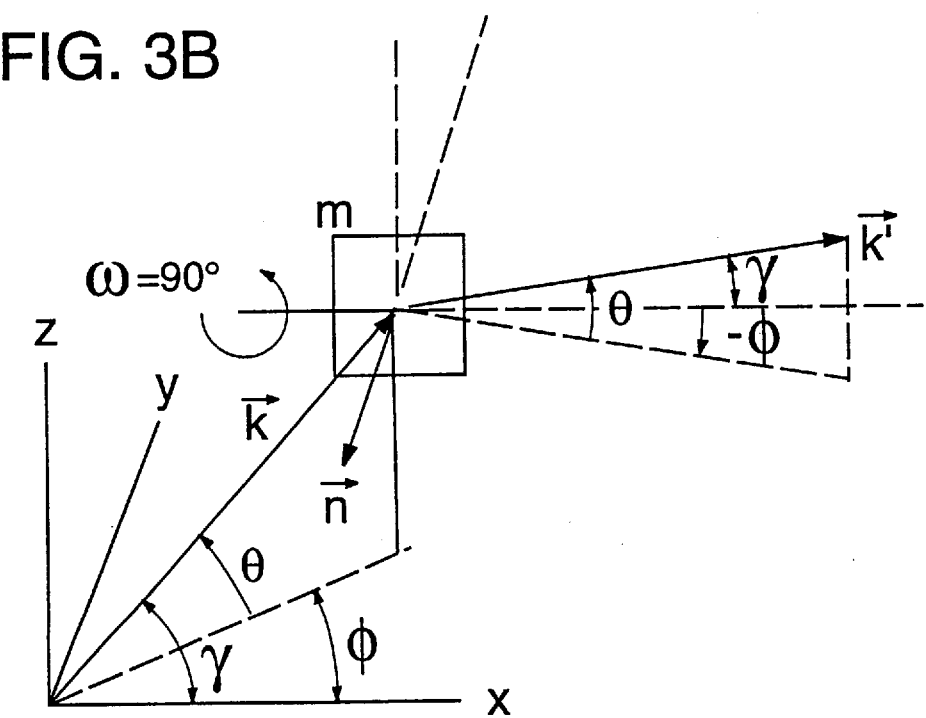
FIG. 3B is a perspective view of a light beam reflected by a vertical plane.

The principle of the light beam divergent angle rotator is demonstrated in FIGS. 3A and 3B. FIG. 3A shows a light beam $\vec{k}$ projected onto a plane parallel to the x-y plane for the purpose of showing the angles light beam $\vec{k}$ makes with the x-y plane and the x-z plane. These angles, θ and φ, are plotted in FIGS. 4–7 to demonstrate the rotation of the divergent angles of this invention. The divergent angle of θ (vertical axis) is measured with respect to the x-y plane and φ (horizontal axis) is measured with respect to the x-z plane. Thus, the light beam is generally designated as (φ,θ) in an angle space.

In FIG. 3A, reflected beam $\vec{k}'$ will have its divergent angle changed to (−θ, φ) when the reflecting plane m is parallel x-y plane. FIG. 3B shows the same beam $\vec{k}$ projected onto a plane parallel to the x-z plane. The reflected beam $\vec{k}''$ has angles θ and −φ. A continuous change of the orientation of the reflecting plane, m, from the configuration shown in FIGS. 3A to FIG. 3B, can be achieved by rotating the reflecting plane, m, along an axis, a, which is parallel to the x axis, by an angle of γ=90°. Here the rotated plane m is represented by a vector n which is normal to the plane and located at the point of incidence where the light beam $\vec{k}$ and the plane m intersects.

In FIG. 3B, the depicted plane m is rotated by an angle ω from its original position to a new fixed position, m', which is counter clockwise to the position of the reflecting plane m. The angle and the direction of the reflected beam $\vec{k}''$, indicated by angles θ and −φ when plotted in angle space are graphically shown in FIG. 4. In this diagram, orientation of a light beam is shown as a point in a coordinate system with the vertical axis indicating the value of θ and the horizontal axis indicating the value of φ. Thus, the incident beam is represented by a point P with coordinate (θ, φ).

In the first instance, the angular coordinates of a beam $\vec{k}'$ reflected off the plane m (having a rotated angle ω=0) changes the value of θ to −θ (see FIG. 3A). On the other hand, the rotated beam of FIG. 3B is represented by P'(0) in FIG. 4, or θ, −φ. That is, when the reflecting plane m is fixed at a rotated position m', the location of P'(ω), the coordinate of the reflected light $\vec{k}'$, can be found by rotating the point P'(0) clockwise around the origin by an angle of 2ω. The reason for the factor of two in rotation of P' is because the reflected light beam changes an angle of 2ω when the plane of reflection changes an angle of ω Thus, if the plane m changes by an angle of ω=90°, the coordinate of the reflected light will rotate by 180° to the point P'(90°) indicated in the diagram, and the reflected light beam will have the angle of (θ, −φ). This prediction agrees with the result indicated by FIG. 3B.

It should be noted that rotating the plane m along an axis parallel to the x-axis will result only in the rotation of the divergent angle of the light beam with respect to the x-axis. The value of the divergent angle, shown as the distance from the point P or P' to the origin is a constant because the plane m rotates around an axis a, parallel to the x-axis. Thus, the value of the divergent angle is defined as the angle that the light beam makes with the x-axis, shown as in FIG. 3A and FIG. 3B. With the divergent angle γ a constant, the reflected light resides on the circumference of a circle of a radius of γ, as shown in FIG. 4 in the angle space.

Let us now discuss propagation of light beams through the light collimating assembly 12 (see FIG. 2). First consider random light entering the collimating assembly 12 through surface 54 which makes an angle of 16° with the x-z plane. Recall that these light beams will have a maximum divergent angle of 42° with respect to the normal to the entrance plane. The distribution of the intensity of the light at particular angles may be represented by distribution graphs including shaded regions such as those shown by FIGS. 5–7. A representation of the divergent angle of the light projected from the light entrance surface 54 in a coordinate system (x', y', z'), shown in FIG. 2, can be represented by a disk with a radius of 42° in the (θ, φ) space, shown in FIG. 5A. It should be noticed that light beams entering the light pipe with a large divergent angle in the z'-direction (large θ value) can only have a small divergent angle in the y-direction (φ value) and vise versa.

To demonstrate the function of the divergent angle rotation and collimation process by elongated microprisms 12, first consider light beam 64 in FIG. 2 propagating normal to the entrance plane in the x'-z' plane and incident on point P1. These light beams will have their value of θ close to zero and value of φ distributed from −42° to +42°. (Here, we first consider a large φ and a small θ such as light beam 64 whereas below we will discuss the case of a small φ and a large θ such as light beam 66). Angular intensity distribution of these light beams is shown as the shaded area in (θ, φ) space in FIG. 5A.

Figure 5A:
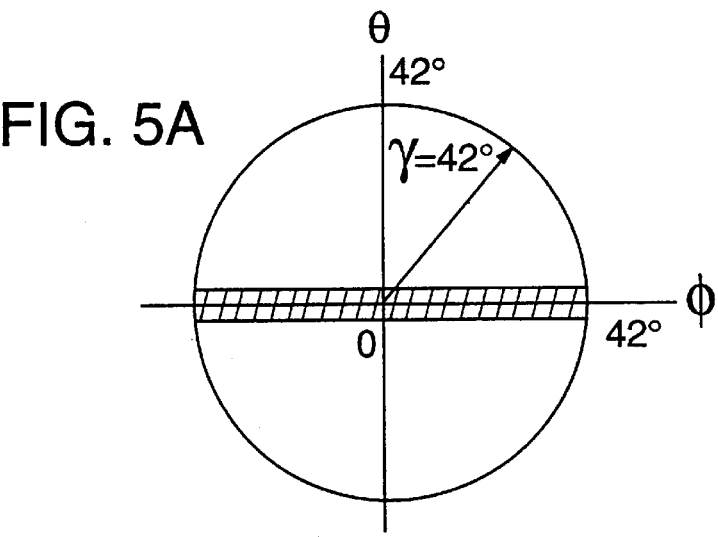
FIGURE 5A is the distribution of light of a small divergent angle in z direction entering the light pipe in the angle space of the coordinate system of light entrance surface.
Figure 5B:
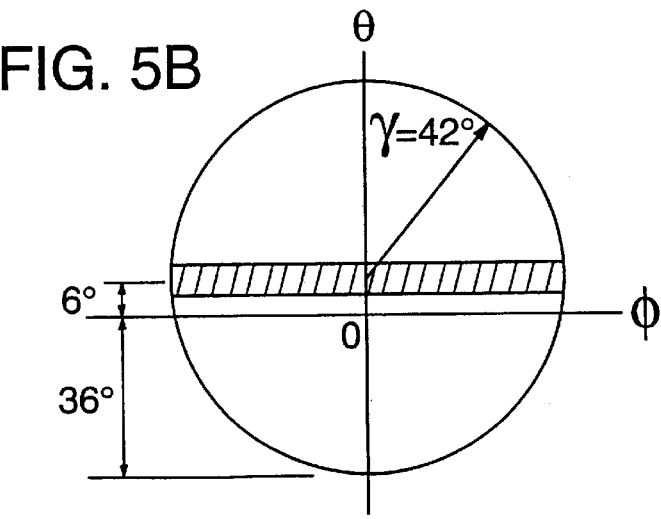
FIG. 5B is the distribution of incident and reflected light of FIG. 5A in the angle space of the coordinate system of the divergent angle rotating prisms.

In order to discuss reflection of light by the microprisms 48, we need to transform light distribution from the (x', y', z') 65 to the coordinate system (x",y", z") 67 of the elongated microprisms 12. With the x-axis rotated by an angle of 6° from the (x',y',z') 65 coordinate system to the (x",y",z") 67 coordinate system, the angular distribution of incident light is shifted upwards by 6° in the (θ, φ) space, as shown in FIG. 5B.

Figure 6A:
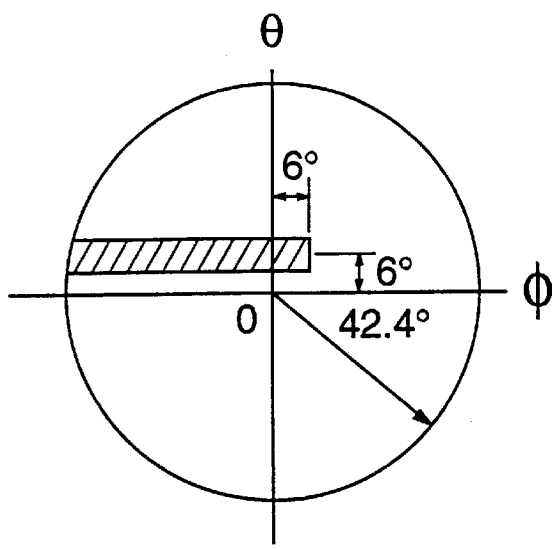
FIG. 6A is the distribution of the light of 5B incident on one of the prism side surfaces in the angle space in coordinate system of the prism.

For convenience, still referring to FIG. 2, let us consider elongated microprisms 12 with a prism angle of 90°, or ω=45° and −45° for the two sides 60 and 62 respectively. Light with the value of φ'≧−6° will thus hit elongated microprism surface 60 which has a positive value of γ with respect to the x"−y" plane. As a result, as shown in FIG. 6A, for surface 60 (which is opposite surface 62), the incident beam which hits the surface 60 will have a intensity distribution extending from −6° to 42° in φ' and θ'≅6°. The beam reflected by surface 60, shown in FIG. 6B, will have a intensity distribution of 6° to −42° in θ' and φ'≅6°.

Figure 6B:
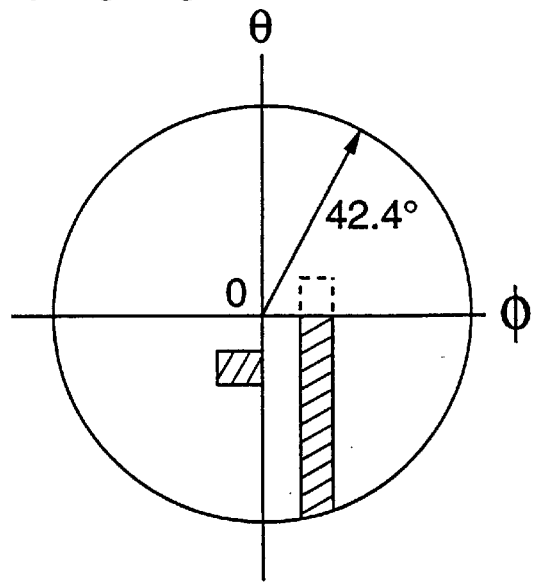
FIG. 6B is the distribution of reflected light of FIG. 6A in the angle space of coordinate system of the divergent angle rotating prisms.

Still referring to FIG. 6B, light with φ'>0, shown as area with a broken line boundary, will propagate towards the opposing surface 62 of the prism and will be reflected downwards to have an angular intensity distribution of θ'≅6° and φ' extend from 0° to −6°. Here it should be noted that the (θ, φ) diagram shown in FIG. 5 and FIG. 6 shows only the range of angle of the light intensity distribution. Because the probability (or "cross section") for light of a negative φ value to hit surface 60 is much less than that of hitting surface 62, intensity of light distributed in the range of 6° to −42° in θ and φ'≅6° is relatively weak.

The probability is small that a beam with a negative φ to hit surface 60 because surface 60 is tilted away from the beam while surface 62 is tilted towards the film. Similarly, light with φ can also hit surface 62 and will therefore have a reduced probability of hitting surface 60 and therefore a reduced intensity. With the side surface of microprisms making an angle of 45° with the x"-y" plane, light beams with $|\phi'/\theta'| \leq \tan 45° = 1$ have a chance of being incident on both of the prism surfaces 60 and 62 although the probability may not be equal. Light beams with $|\phi'/\theta'| \geq \tan 45° = 1$ can hit only one of the sides.

With symmetry, reflection of light by surface 62 is similar to that of surface 60 except with the sign of φ changed. Thus, light beams reflected first by surface 62 will finally have a distribution of 0° to −42° in θ'; φ'≅−6° and θ'≅6°; φ' from 0° to −6°.

Again referring to FIG. 2, let us again consider the divergent angles in the laboratory coordinate system (x, y, z). To the x-y-z coordinate system, the reflected beams will have the θ value reduced by 10° (the range is now from −10° to +32°, and 4°) and φ value unchanged. (≅±6°, and −6° to 6°). The reflected beam with negative θ value will propagate downwards toward the second side surface of the collimating prism. Since there is no microprism structure on the surface 54, light reflected from this surface will only have their divergent angle reduced by twice the slope of the surface, or 14°, and therefore collimated to φ=φ' (0° to ≅±6°), θ=−10° to +18°.

Having discussed collimation of light originally having a large φ value, we now consider light originally having a large divergent angle with respect to the x-z plane, that is, light with a large θ value. Light beams with a large θ value, such as 66, will hit P2, the section of the collimation assembly close to the light source. Since these light beams already have a small φ value, there is no need to rotate its divergent angle. The area of the surface near the light entrance surface 54 can therefore have a smooth surface, or composed of microprisms with a small prism angle. Light beams hitting an area close to the light entrance section of the side wall will have their divergent angle θ reduced by twice the angle that the side surface makes with the x-axis. The reflected beam will propagate towards the other side of the collimating prism to further reduce this divergent angle with respect to the x-y plane and will eventually come out of the collimating prism with a small divergent angle in both dimensions.

Figure 7A:
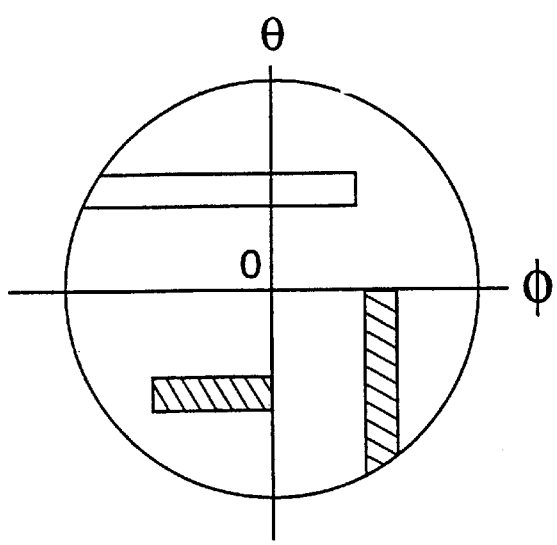
FIG. 7A is the distribution of incident and reflected light of a 20° divergent angle in z direction entering the light pipe in angle space in the coordinate system of the divergent angle rotating prisms with 90° prism.
Figure 7B:
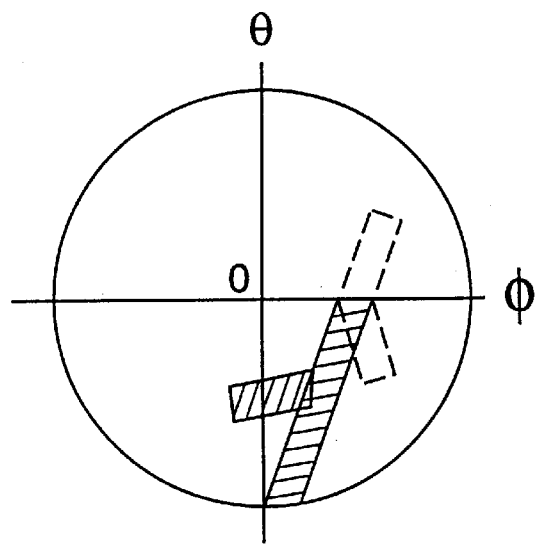
FIG. 7B is the distribution of reflected light of FIG. 7A in the angle space of the coordinate system of the divergent angle rotating prisms with 120° prism.

We now consider light entering the collimation prism with a divergent angle where φ and θ are similar in volume. As an example, consider light beam 68 hitting the divergent rotating prisms at P3 with θ=20°. Referring to FIG. 7A, the bounded area with φ >0° indicates the angular intensity distribution of light hitting surface 60 of microprisms. On the other hand, the shaded area in FIG. 7A shows the angular intensity distribution of reflected light by microprisms of an angle of 90°. FIG. 7B shows distribution of light reflected from microprisms of an angle of 120° (each side making an angle of 30° with the side surface 62). With the 90° prism, the reflected beam has mainly φ'=20° while the 120° prism results in a continuously distribution of φ' from 0° to +23° with most of the light distributed with a very small φ' value. Rotating light beams with the 120° prism result in a reduced average divergent angle in φ'.

Since light with a large divergent angle in the x'-z' plane has a small divergent angle in the x'-y' plane, the side surface of microprisms may have a curved surface to reduce the divergent angle in φ more efficiently than microprisms with a flat side. This configuration is particularly suitable for light beams with a continuous distribution of divergent angles in both dimensions. Light with a large divergent angle in the x-y plane (and a small divergent angle with respect to the x-z plane) will hit only the lower section of the microprism and will rotate a larger angle in the (θ, φ) space to have their angle in the two directions essentially interchanged. Light beams with a large θ value will also have a small φ value. These beams will have a large probability of hitting areas of microprisms near the tip where the slope is smaller. These beams will rotate a small angle in the (θ, φ) space and will result in a smaller divergent angle of φ.

Figure 8:
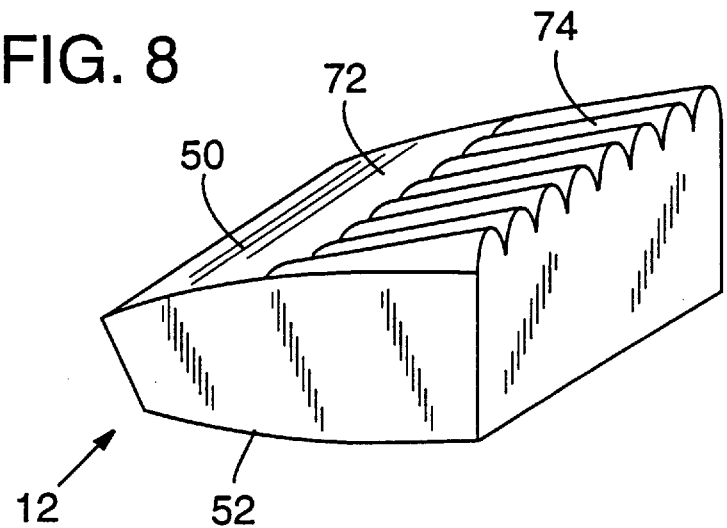
FIG. 8 is a divergent angle rotating microprism with a curved surface.

FIG. 8 shows a second embodiment where the microprism angle 72 changes with the coordinate x and relative to surfaces 50 and/or 52. This arrangement is effective since only light with a large θ value will hit elongated microprisms structure 74 located close to the light entrance end. Note that the individual microprisms of the elongated microprism structure 74 have a curved cross-section. Any suitable curvature or angular configuration, or combination of the elongated microprism structure is contemplated by this invention.

Figure 9A:
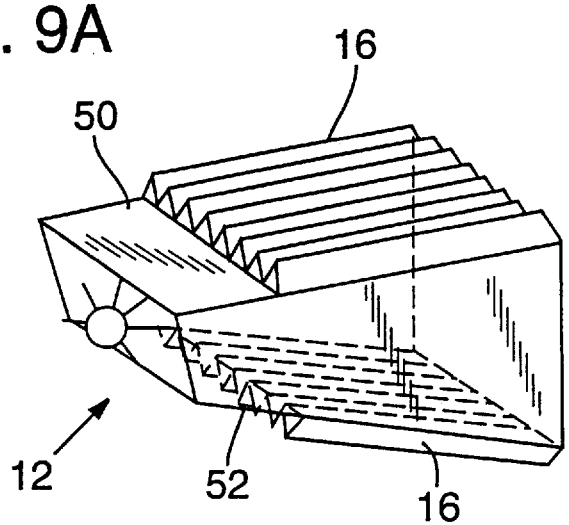
FIG. 9A is a sectional view of a light beam divergent angle rotator with microprisms on both sides, taken in x-z plane.
Figure 9B:
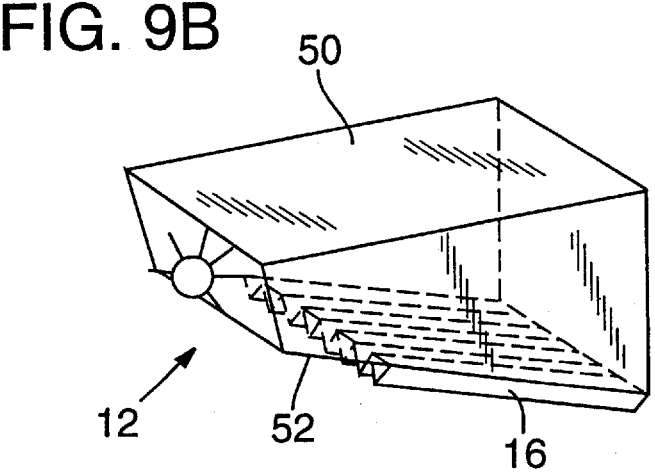
FIG. 9B is a sectional view of a light beam divergent angle rotator with divergent angle rotating prisms on the lower side surface, taken in x-z plane.

Another embodiment of the light collimation assembly is shown in FIG. 9A. In this embodiment, both of the surfaces 52 and 54 have elongated microprism structures to collimate and rotate the light beams. In this embodiment, the divergent angle in two dimensions are more evenly mixed and so provide better uniformity in the two dimensional collimation. A fourth embodiment is shown in FIG. 9B where the divergent angle rotating elongated microprism structure 16 is located only on the lower surface 52. With this embodiment, the divergent angle in the x-z plane is reduced first before it is rotated.

Figure 10:
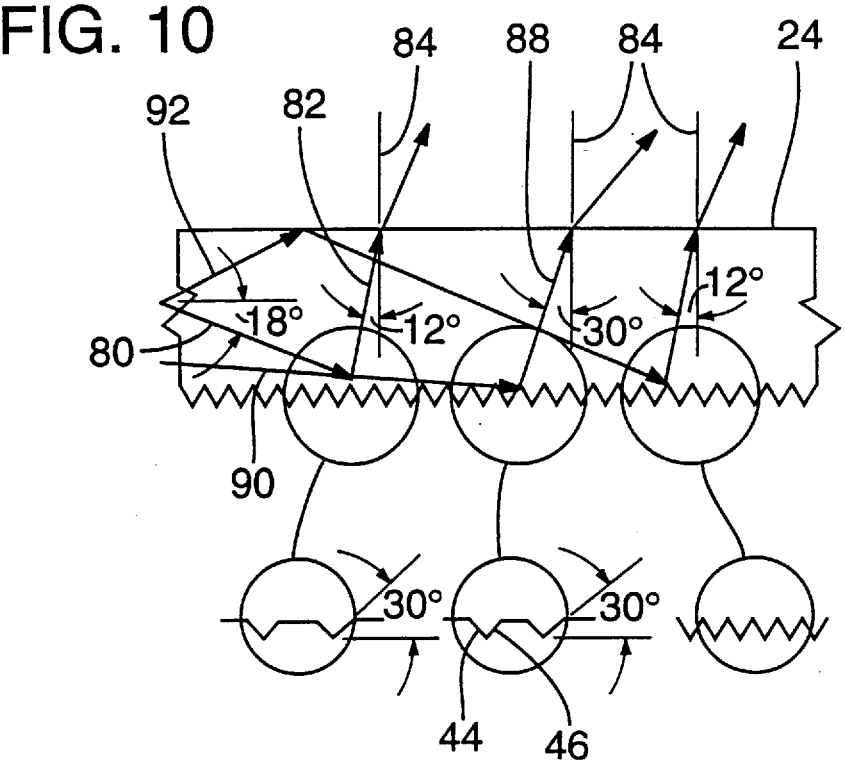
FIG. 10 is a sectional view of light directing or light collimating assemblies using microprisms to reflect light out.

Having described the way in which light from source 2 is directed by the light directing assembly 12, attention is now directed to the way in which the beam expanding light pipe 6 in cooperation with microprism arrangement 8 act on the input light to provide output light. To demonstrate the mechanism of reflecting light out of the beam expander 6, we will first consider the situation when light enters the light pipe from only one end, as shown in FIG. 10 which gives a cross sectional view of the beam expander 6 in the x-z plane. It will be assumed that the maximum divergence angle at which light enters the backlighting light pipe is ±18° in the x-y plane, as depicted in FIG. 10.

In the particular embodiment illustrated in FIG. 10, each prism has its side surfaces 44 and 46 making an angle of 30° with the x-y plane. It is to be understood that the present invention is not limited to these particular physical parameters, but may incorporate any suitable angles or curvatures. The material as well as the angle that the surface of the microprism makes with the top surface of the light pipe may all have different values. The reflecting microprisms may also have curved surfaces to focus output light.

Still referring to FIG. 10, note specifically that the incoming light beam 80, which deviates by 18° from the x-y plane, will hit the surface of a prism, be bent by 60°, and then propagate in direction 82 which deviates by +12° from the normal direction 84. The light beam 90 which propagates nearly parallel to the x-axis will be bent by 60° and propagate in direction 88 which deviates by +30° from the normal 84 to surface 24. The light beam 92 which initially deviates by −18° from the x-axis will hit the underside of the side surface 24 and then propagate towards the −x direction, whereupon it will be reflected by one surface of a microprism in a way similar to light beam 82, thereby propagating in the direction at an angle of +12° with the normal. This process happens to all light beams, making a negative angle with the x-axis. As a result, light beams exiting the beam expander light pipe through the top surface 24 will be collimated to one-half their original divergence angles in the x-z plane, that is, one-half that at which light enters the light pipe 10.

With the maximum divergence angle of light coming from the light collimating section less than or equal to the critical angle of refraction with respect to the surface of the microprisms, no light can escape the light pipe from the wrong side. With this configuration, light output from the light pipe will have its divergent angle vary from 12° to 30° inside the light pipe and from 18° to 48° in air as determined by the Snell's law. Using two light sources 2 and 4 located at opposite sides of the light pipe, the output light will propagate off-normal, from +18° to +48° and from -18° to -48° in the air.

Figure 11:
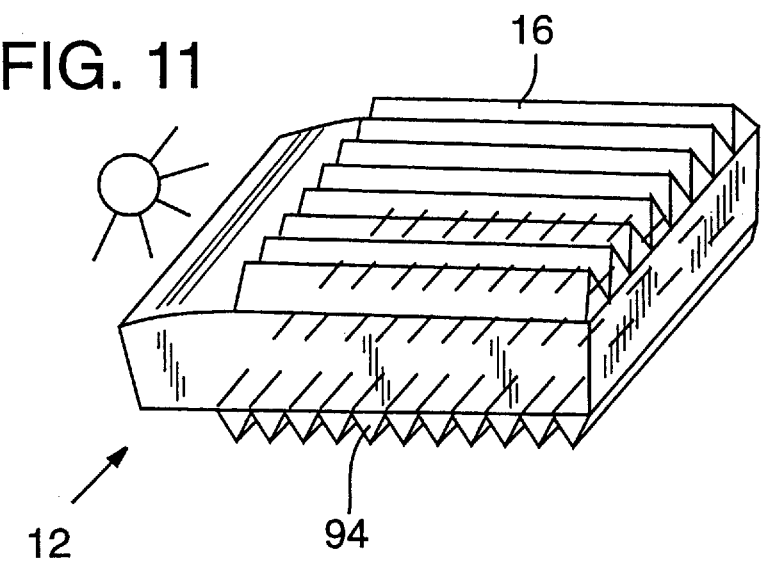
FIG. 11 is a sectional view of a beam expander light pipe with rows of divergent angle rotating microprisms on its top surface.

Although the beam expander 6 is divided into a collimating assembly and beam expander light pipe, the two units can be an integral piece. Furthermore, the divergent angle rotating elongated microprism structure 16 can be extended into the beam expander light pipe section. A light pipe with the whole top surface covered with a divergent angle rotating elongated microprism structure 16, as shown in FIG. 11, also provides an improved uniformity since the light beams' directions are continuously changed.

It should be noted that an issue with specular-reflection based backlighting system, such as the Flat Collimator technology, is image related non-uniformity. Microprisms in the light pipe reflect light like mirrors. Images of the side walls, as well as light pipe edges, can be observed, and a relatively strong diffuser is usually needed to cover the images. The strong diffuser reduces the output brightness. In the current invention, the microprisms located on the right side of the beam expander destroys the images by reflecting light beams sideways through rotating the divergent angle. This beam expander will therefore have an improved uniformity and requires less diffuser and preserves the collimation since the divergent angle rotation process does not affect the value of the total deviation angle. The resulting backlighting system will therefore have an even higher brightness with the reduction of a diffuser or use of a diffuser with less diffusing power. Microprisms with a curved surface which makes a relatively small angle with the top surface is preferred for this embodiment. For light reflected out by microprisms located on the bottom surface, prisms located on the top surface tends to focus the light towards the normal direction just like microlenses.

Figure 12:
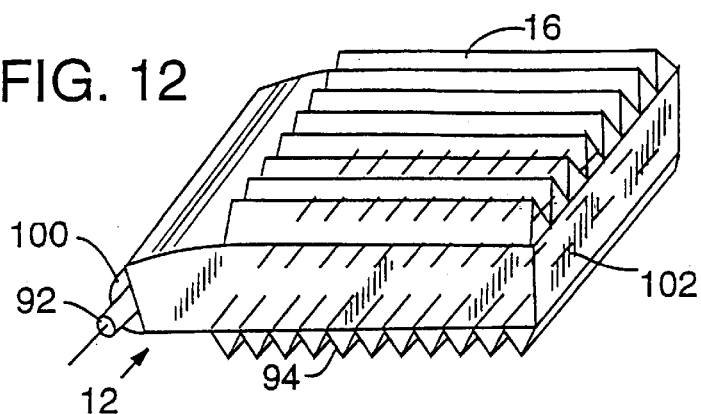
FIG. 12 is a sectional view of a beam expander assembly using a linear light source.

An embodiment of the invention, shown in FIG. 12, uses a linear light source such as a cold cathode fluorescent lamp 92. In this situation, the beam expander 6 has a width approximately equal to the width of the active area of the display. In this embodiment, the beam expander expands the linear light source into a plane light source. As shown in FIG. 12, a mirror reflector 100 is wrapped around the lamp 92 to collimate light in one dimension to have a small θ value. Divergent angle rotating elongated microprism structure 16 is created on the top surface to rotate the light beams so that output light is collimated in both dimensions. Microprisms 94 located on the bottom surface are used to reflect light out. The side of the light pipe opposing the lamp is coated with a reflecting film 102 to reflect light back towards the microprisms. The side with reflecting film 102 may be made to tilt towards the bottom surface so that essentially all of the light will be reflected out by the microprisms.

Figure 13:
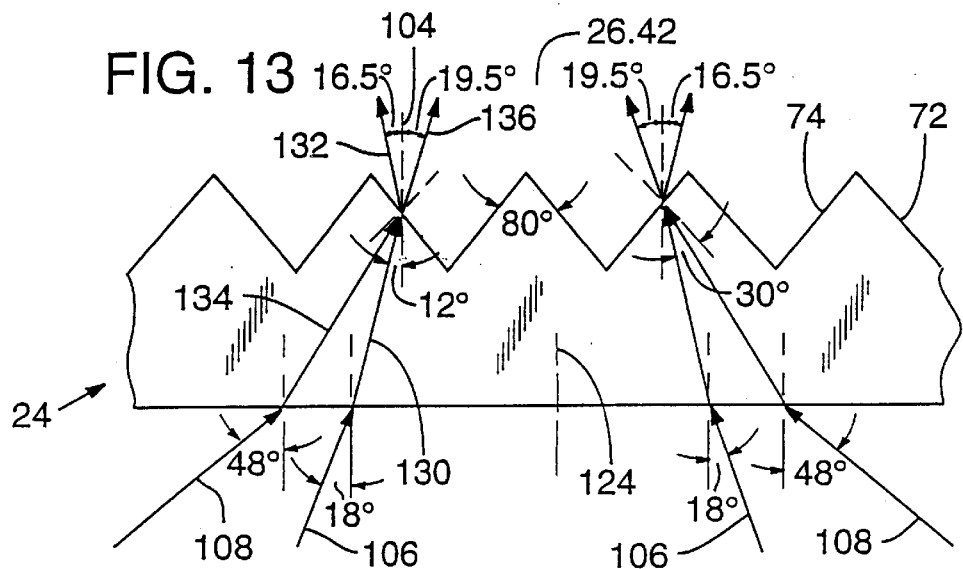
FIG. 13 is a sectional view of the use of a turning film with microprisms on its surface.

Having discussed the functioning of the beam expander 6, we will now discuss the use of a film with microprisms to bend light beams towards the normal direction indicated by normal axis 104. As discussed above, output light from the beam expander 6 propagates off-normal, from +18° to +48° and from -18° to -48° as indicated by light beams 106 and 108. A film is needed to change the propagation direction of the two beams towards the normal direction. As shown in FIG. 13, a prismatic film 24 with prismatic angle of 80° is used to bend output light originating from the light sources 2 and 4 to the forward direction, that is, into the light pipe 30.

Light ray 130 which has a deviation angle of 12° inside the film which is also made of acrylic will be bent by 28.5° towards the normal direction 124 and will propagate in the direction of light ray 132 which deviates from the direction of 124 by -16.5°. Light ray 134 which has a deviation angle of 30° will be bent by -10.6° and will propagate in the direction of light ray 136 which deviates from the direction of the normal 124 by 19.4°. Similarly, light with deviation angle from -12° to -30° will hit the surface 74 of the film 24 and will have the deviation angle changed to +16.5° and -19.4°. The two light beams coming from the two lamps 2 and 4 each located on the opposite ends of a light pipe is now combined to for a single beam propagate from -19.4° to +19.4°. This angular distribution of the combined output light matches the viewing angle of most LCDs in the x-z plane very well and is suitable for normal portable display device application.

For applications which need a narrower divergent angle but a brighter output, a prismatic film with a smaller angle, such as 70°, can be used to bend the two beams towards the normal direction. Similarly, a somewhat wider viewing angle can be achieved with a prismatic film with a larger angle such as 90°. For a very wide viewing angle, such as ±40°, a prismatic film with a prism angle of a larger angle, for example, 100° may be used. Light output from this film will still be composed of two beams with the peak intensity for each beam separating by approximately 40°. A diffuser, such as a holographic diffuser, may then be used to expand the divergent angle of both beams so the two beams overlap to achieve a divergent angle of ±40°.

Another embodiment to achieve a wide viewing angle is to use prismatic films of a curved surface. For the particular light pipe described above, a prismatic film with prisms having the two sides with curvature varying from 35° to 65° will give output light with a divergent angle of 40°. A backlighting system with a very bright output and a wide divergent angle is suitable for video applications.

Now we turn our attention to lighting the light pipe 30. The light pipe 30, like the beam expander 6, has microprisms located on its bottom surface to reflect light out of the light pipe into for example, an LCD. The axis of the microprisms on the lighting light pipe are perpendicular to the mean direction of propagation of light. In this particular example, microprisms located on the bottom surface makes an angle of 30° with the bottom surface. The microprisms also have a curved surface to focus the output light. Like the beam expander light pipe, the divergent angle of output light in the y-direction is 18° to 48° in air. A film with microprisms of a prism angle of 80°, similar to the film described above but with a wider width, may be used to bend the propagation direction towards the normal direction.

Figure 14A:
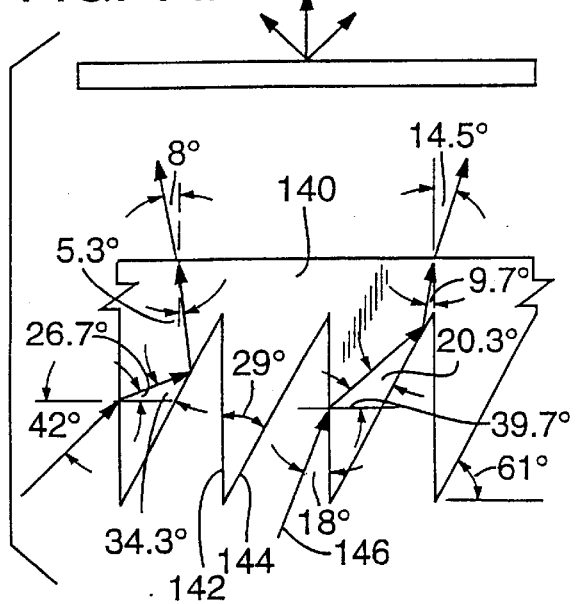
FIG. 14A is a perspective view of the use of a total internal reflection based film to bend light towards the normal direction.
Figure 14B:
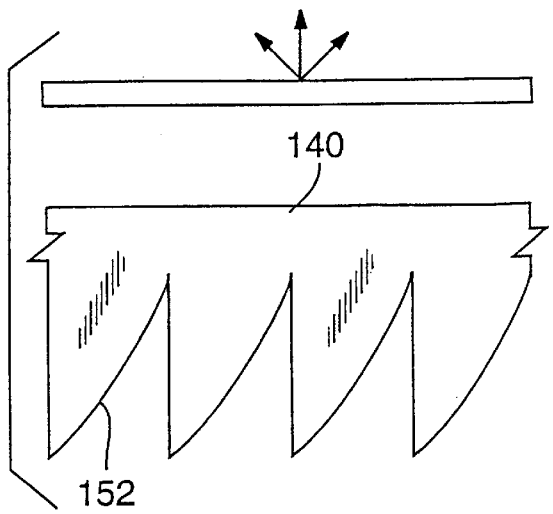
FIG. 14B is a perspective view of the use of a total internal reflection based film with microprisms of a curved surface to bend light towards the normal direction and also increase the divergent angle of the light.

For the embodiments shown in FIGS. 11 and 12, only one lamp is used. Since light enters the light pipe from only one side, a total internal reflection-based film, as shown in FIG. 14A, may also be used to bend light towards the viewer. On the side of the film facing the light pipe, one microprism surface 142 has a slope of 90°. The other side surface of the microprism 144 has an angle of 61°. Light with a divergent angle of 48° will enter the film from side 142 and be total internally reflected by side surface 144. This light beam will exit the film with an angle of −8° from the normal to the film from surface 140. Similarly, light beams with a divergent angle of 18° will also be totally reflected by this film and exit the film with an angle of 6° from the normal. A diffuser 86 is used to expand the divergent angle of the output light to match the viewing angle of the display. FIG. 14B shows a similar film with a curved side surface 152. This film will bend as well as expand the light beams.

Figure 15:
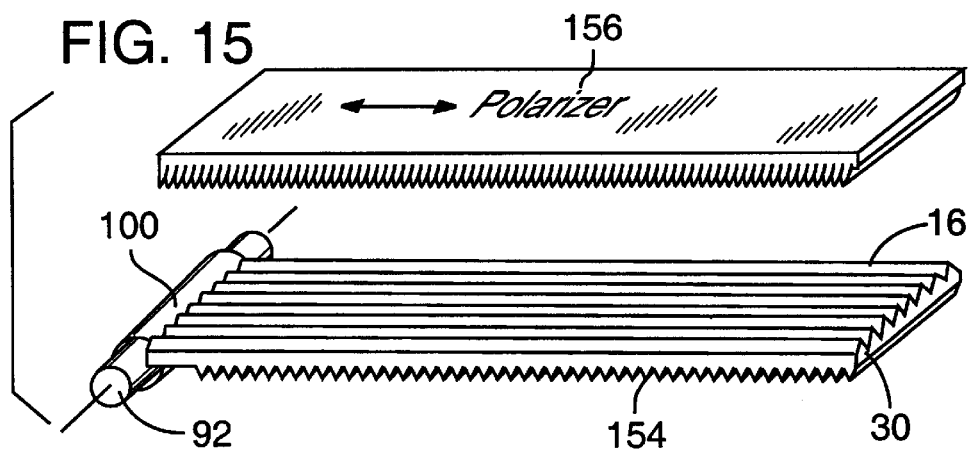
FIG. 15 is the perspective view of a very thin backlighting system using a polarizer with microprisms on its surface to bend, expand and polarize light coming from a thin light pipe.

It is desirable for a portable display to have a minimum weight and thickness. FIG. 15 shows the use of a light pipe thinner than the diameter of the lamp for LCD backlighting. The light entrance side of the light pipe faces the CCFL lamp is wrapped around with a silver coated film which has a very high reflectivity (≅95%). The lamp 92 and the reflective film 100 form a light box and efficient coupling of light into the light pipe 30 is achieved by a feed back mechanism. Light emitted from the lamp and not directed at the light pipe may be reflected by the reflecting film to have its direction re-orientated. There is a possibility that the reflected light may direct at the light pipe to be effective for display lighting. This process is repeated and an effective coupling of light into the light pipe is achieved.

Light entering the light pipe is mainly collimated in the x-z plane. The light pipe has a divergent angle rotator elongated microprism structure 16 on the top surface and light collimating and reflecting microprisms 154 on the bottom surface. To further reduce the weight and thickness, beam turning and expanding microprisms are created on 156 a polarizer film which may be laminated to the liquid crystal panel. This embodiment provides therefore an extremely thin backlight system since no independent film is required for the backlighting system. With the polarizer and light bending-expanding film, output light is polarized and have a divergent angle matching the viewing angle of the display. Microprisms may be created on a polarizer film by the technology of ultraviolet light curing of an acrylic resin using a transparent mold.

Figure 16:
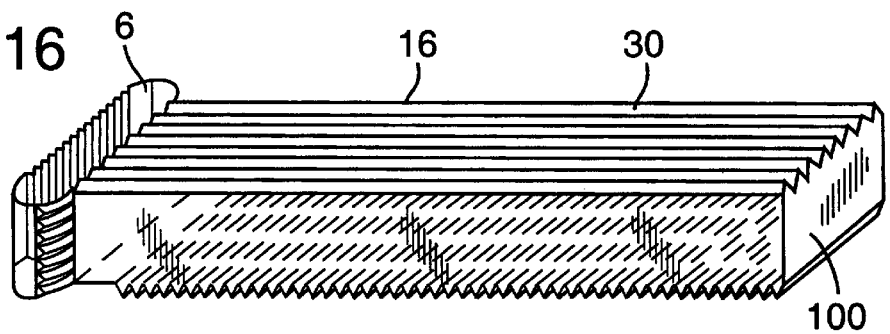
FIG. 16 is a perspective view of a lighting system with the beam expander and the lighting light pipe an integral unit.

Another embodiment of the invention is shown in FIG. 16. In this embodiment, the beam expander 6 is laminated to the light pipe 30. Made of a single piece, this backlighting unit is suitable for mass production and easy for installation. However, it is difficult to place light bending films between the beam expander 6 and the light pipe 30 in this embodiment and therefore may be eliminated. Light entering the light pipe 30 will have a large divergent angle of φ. Output from the lighting light pipe will therefore be composed of four beams with large angle of φ as well as θ. Since the light-bending film can only bend and combine the propagation direction of light in one dimension, output of this backlighting system will be composed of two beams propagating sideways. This output profile is typically not suitable for most display lighting applications.

Bending light in the φ direction can be achieved by an elongated microprism structure 16 on the top surface of the light pipe 30. As is discussed above, light beams inside the light pipe will have their divergent angle rotated whenever it hits microprisms located on the top surface of the light pipe. By mixing the value of θ and φ, output light will have a continuously distributed φ value and only one film is needed to bend the output light beams towards the normal direction.

Figure 17:
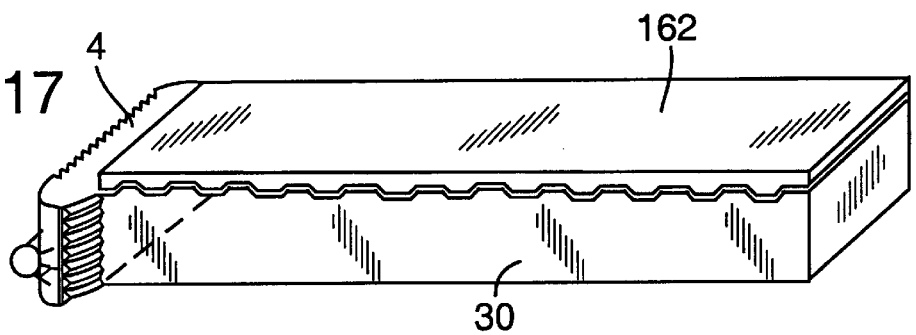
FIG. 17 is a perspective view of the use of a divergent rotator with a frontlighting system.

An embodiment using a beam expander for a frontlighting assembly is shown in FIG. 17. Light is reflected out of the light pipe by microprisms. An optical compensator 162 is used to eliminate or minimize image distortion.

Figure 18A:
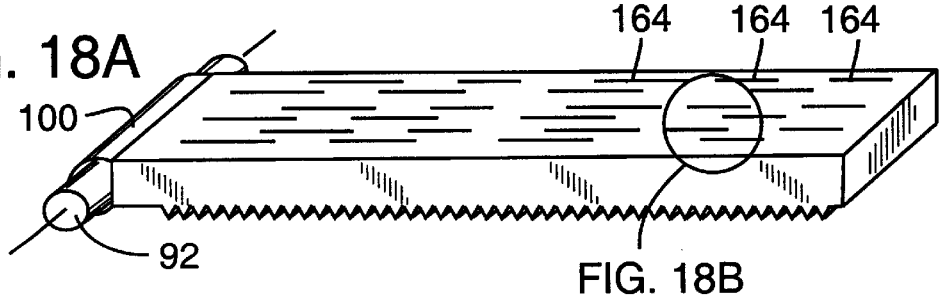
FIGS. 18A and FIG. 18B are perspective views of the use of randomly distributed microprisms to rotate the divergent angle of light.
Figure 18B:
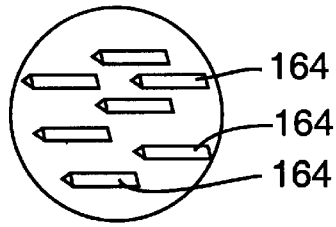

In all of the above embodiments, the divergent angle rotator is composed of substantially identical microprisms arranged in rows. However, other configurations of the microprisms such as randomly arranged structure of lines of grooves or microprisms 164, shown in FIGS. 18A and 18B, can also be used to rotate divergent angle. With randomly distributed microprisms of different lengths, output light will have an improved uniformity. This arrangement eliminates the need to use an additional diffuser and will result in a thinner and simpler backlighting system.

Other configurations of the microstructures such as structure of sub-micron lines of grooves or microprisms created as a hologram can also be created on the top surface of the light pipe to rotate the divergent angle of light inside the light pipe. A hologram normally records laser light reflected off of an object combined with a second beam called the reference beam. A hologram of one dimensional diffuser are structure of miniature line structures created precisely by the interference of laser beams. The functioning of the divergent angle rotator depends of the axis of the individual microprism being approximately parallel to the mean propagation direction of light.

What is claimed is:

1. A light beam divergent angle rotating assembly, comprising:
    (a) a prism having opposing top and bottom surfaces which define the thickness of said prism, opposing sides which define the width of said prism, and opposing ends which define the length of said prism;
    (b) means for directing light into the said prism in a predetermined manner so that it has a mean light propagation direction; and
    (c) an arrangement on at least one of said opposing surfaces including adjacent microstructures in rows extending approximately in the mean light propagation direction of the light in said prism, wherein said microstructures are randomly distributed.

2. An assembly as recited in claim 1 wherein said microstructures are microprisms.

3. An assembly as recited in claim 2, wherein said microprisms have curved surfaces.

4. An assembly as recited in claim 1 wherein said microstructures are microgrooves.

5. An assembly as recited in claim 1, wherein said microstructures are identical microprisms, each of said microstructures having a vertex extending upward from a rectangular base so as to define each vertex as an upwardly angled light reflecting surface segment.

6. An assembly as recited in claim 1, wherein said microstructures are elements of a hologram.

7. An assembly as recited in claim 1 wherein said means for directing light is a reflecting film wrapped around a light source.

8. An assembly as recited in claim 1 wherein said means for directing light is a light source having a diameter and said divergent angle rotating assembly is thinner than said diameter of said light source.

9. An assembly as recited in claim 1 wherein said prism has a light entrance surface which is tilted towards one of said surfaces of the prism.

10. An assembly as recited in claim 1 wherein said top and bottom surfaces of said prism taper outward away from one another.

11. A beam expanding assembly to expand a light of a point-like light source into a line light source having a mean propagation direction or expand the light of a line-like light source into a plane light source having a mean propagation direction, comprising:

(a) a light pipe having opposing top and bottom surfaces which define the thickness of said light pipe, opposing sides which define the width of said light pipe, and opposing ends which define the length of said light pipe;

(b) a light source for directing light into said light pipe, said light having a mean light propagation direction, and (c) elongated microprisms extending approximately in said mean light propagation direction on said top surface configured to rotate the divergent angles of light beams in a predetermined way.

12. An assembly as recited in claim 11 wherein said bottom surface includes microprisms for directing light out of said top surface.

13. An assembly as recited in claim 11 wherein said top surface has a normal and wherein a film is on said top surface to direct light output from the light pipe towards a predetermined direction.

14. An assembly as recited in claim 13 wherein said film has microprisms on its surface.

15. An assembly as recited in claim 14 wherein said microprisms on the surface of said film generate light output by total internal reflection.

16. An assembly as recited in claim 13 wherein said film polarizes light.

17. An assembly as recited in claim 11 wherein said light source has a diameter and wherein said light pipe is thinner than said diameter of said light source.

18. An assembly as recited in claim 11 wherein said light source has a diameter and wherein said light pipe is thinner than one half of said diameter of said light source.

19. An assembly as recited in claim 11 further comprising a lighting light pipe.

20. An assembly as recited in claim 19 wherein said beam expander assembly and said lighting light pipe are physically connected as an integral unit.

21. An assembly as recited in claim 19 wherein said lighting light pipe is a backlighting light pipe.

22. An assembly as recited in claim 19 wherein said lighting light pipe is a frontlighting light pipe.

23. An assembly as recited in claim 19 wherein said lighting light pipe has a wedge shape.

24. An assembly as recited in claim 19 further comprising a second lighting light pipe.

25. An assembly as recited in claim 24 wherein said second lighting light pipe has opposing top and bottom surfaces which define the thickness of said second lighting light pipe, opposing sides which define the width of said second lighting light pipe, and opposing ends which define the length of said second lighting light pipe, said second lighting light pipe having a lengthwise axis and wherein said second lighting light pipe has a width approximately equal to the length of said first light pipe, said second lighting light pipe includes an arrangement of immediately adjacent microprisms in rows extending normal to said lengthwise axis of said second lighting light pipe on the bottom surface of said second lighting light pipe, each of said microprisms having its vertex extending downward from a rectangular base so as to define said vertex an upwardly angled light reflecting surface segment for reflecting light within said second lighting light pipe upwards through its top surface in a generally collimated manner.

26. An assembly as recited in claim 19 wherein said lighting light pipe has opposing top and bottom surfaces which define the thickness of said lighting light pipe, opposing sides which define the width of said lighting light pipe, and opposing ends which define the length of said lighting light pipe, said lighting light pipe having a lengthwise axis and wherein said lighting light pipe includes an arrangement of immediately adjacent microprisms in rows extending normal to said lengthwise axis of said lighting light pipe on the bottom surface of said lighting light pipe, each of said microprisms having its vertex extending downward from a rectangular base so as to define said vertex an upwardly angled light reflecting surface segment for reflecting light within said lighting light pipe upwards through its top surface in a generally collimated manner.

27. An assembly as recited in claim 26 wherein said top surface has a normal and wherein a film is on said top surface to direct light output from the light pipe towards a predetermined direction.

28. An assembly as recited in claim 27 wherein said film has microprisms on its surface.

29. A lighting light pipe assembly comprising:

(a) opposing top and bottom surfaces which define the thickness of said lighting light pipe, opposing sides which define the width of said lighting light pipe, and opposing ends which define the length of said lighting light pipe, said length further defining a mean light propagation direction;

(b) means for directing light into said lighting pipe assembly;

(c) elongated microstructures extending approximately in said mean light propagation direction on said top surface configured to rotate the divergent angles of light beams in a predetermined way; and (d) said lighting light pipe having a lengthwise axis and an arrangement of immediately adjacent microprisms in rows extending normal to said lengthwise axis of said lighting light pipe on the bottom surface of said lighting light pipe, each of said microprisms having its vertex extending downward from a rectangular base so as to define said vertex an upwardly angled light reflecting surface segment for reflecting light within said lighting light pipe upwards through its top surface in a generally collimated manner.

30. A lighting light pipe as recited in claim 29 wherein said lighting light pipe is a backlight.

31. A lighting light pipe as recited in claim 29 wherein said lighting light pipe is a frontlight.

32. A lighting light pipe as recited in claim 29, wherein said microstructures are uniformly distributed.

33. A lighting light pipe as recited in claim 29, wherein said microstructures are randomly distributed.

34. A lighting light pipe as recited in claim 29 wherein said microstructures are microprisms.

35. A lighting light pipe as recited in claim 34, wherein said microprisms have curved surfaces.

36. A lighting light pipe as recited in claim 29 wherein said microstructures are microgrooves.

37. A lighting light pipe as recited in claim 29, wherein said microstructures are identical microprisms, each of said microstructures having a vertex extending upward from a rectangular base so as to define each vertex as an upwardly angled light reflecting surface segment.

38. A lighting light pipe as recited in claim 29, wherein said microstructures are elements of a hologram.

39. A lighting light pipe as recited in claim 29 wherein said means for directing light into said lighting light pipe is a beam expander.

40. A lighting light pipe as recited in claim 39 wherein said beam expander comprises:

(a) a light pipe having opposing top and bottom surfaces which define the thickness of said light pipe, opposing sides which define the width of said light pipe, and opposing ends which define the length of said light pipe;

(b) a light source for directing light into said light pipe, said light having a mean light propagation direction, and (c) elongated microprisms extending approximately in said mean light propagation direction on said top surface configured to rotate the divergent angles of light beams in a predetermined way.

41. A lighting light pipe as recited in claim 40 wherein said light source is a point-like light source.

42. A lighting light pipe as recited in claim 41 wherein said light source is a linear-like light source.

43. An assembly as recited in claim 29 wherein said top surface has a normal and wherein a film is on said top surface to direct light output from the light pipe towards a predetermined direction.

44. An assembly as recited in claim 43 wherein said film has microprisms on its surface.

45. A method for providing a light beam divergent angle rotating assembly, comprising the steps of:

(a) providing a prism having opposing top and bottom surfaces which define the thickness of said prism, opposing sides which define the width of said prism, and opposing ends which define the length of said prism;

(b) providing a light directing assembly which directs light into the said prism in a predetermined manner; and (c) providing an arrangement on at least one of said opposing surfaces including adjacent microstructures in rows extending approximately in the mean light propagation direction of the light in said prism, wherein said microstructures are randomly distributed.

46. A method for providing a beam expanding assembly to expand a light of a point-like light source into a line light source having a mean propagation direction or expand the light of a line-like light source into a plane light source having a mean propagation direction, comprising the steps of:

(a) providing a light pipe having opposing top and bottom surfaces which define the thickness of said light pipe, opposing sides which define the width of said light pipe, and opposing ends which define the length of said light pipe;

(b) providing a light source for directing light into said light pipe, said light having a mean light propagation direction, and (c) providing elongated microprisms extending approximately in said mean light propagation direction on said top surface configured to rotate the divergent angles of light beams in a predetermined way.

47. A method as recited in claim 46 further comprising the step of:

(d) providing a lighting light pipe.

48. A method as recited in claim 47 further comprising the step of:

(e) integrally forming said beam expanding assembly and said lighting light pipe as a single unit.

49. A method for providing a lighting light pipe assembly, comprising the steps of:

(a) providing opposing top and bottom surfaces which define the thickness of said lighting light pipe, opposing sides which define the width of said lighting light pipe, and opposing ends which define the length of said lighting light pipe, said length further defining a mean light propagation direction;

(b) providing a light directing assembly which directs light into said lighting pipe assembly; and (c) providing elongated microstructures extending approximately in said mean light propagation direction on said top surface configured to rotate the divergent angles of light beams in a predetermined way; and (d) providing said lighting light pipe having a lengthwise axis and an arrangement of immediately adjacent microprisms in rows extending normal to said lengthwise axis of said lighting light pipe on the bottom surface of said lighting light pipe, each of said microprisms having its vertex extending downward from a rectangular base so as to define said vertex an upwardly angled light reflecting surface segment for reflecting light within said lighting light pipe upwards through its top surface in a generally collimated manner.

* * * * *